US012128368B2

(12) United States Patent
Gupta

(10) Patent No.: US 12,128,368 B2
(45) Date of Patent: *Oct. 29, 2024

(54) AERATOR

(71) Applicant: Tasz, Inc, Lenoir, NC (US)

(72) Inventor: Chakra V. Gupta, Lenoir, NC (US)

(73) Assignee: Tasz, Inc., Lenoir, NC (US)

(*) Notice: Subject to any disclaimer, the term of this patent is extended or adjusted under 35 U.S.C. 154(b) by 93 days.

This patent is subject to a terminal disclaimer.

(21) Appl. No.: 17/960,878

(22) Filed: Oct. 6, 2022

(65) Prior Publication Data

US 2023/0044212 A1 Feb. 9, 2023

Related U.S. Application Data

(63) Continuation of application No. 17/033,784, filed on Sep. 26, 2020, now Pat. No. 11,484,850.

(60) Provisional application No. 62/906,371, filed on Sep. 26, 2019.

(51) Int. Cl.

| | |
|---|---|
| ***B01F 23/236*** | (2022.01) |
| ***B01F 23/232*** | (2022.01) |
| ***B01F 25/431*** | (2022.01) |
| ***B01F 25/441*** | (2022.01) |
| *B01F 23/237* | (2022.01) |
| *B01F 101/17* | (2022.01) |

(52) U.S. Cl.

CPC .......... *B01F 23/236* (2022.01); *B01F 23/232* (2022.01); *B01F 23/2362* (2022.01); *B01F 25/431* (2022.01); *B01F 25/44164* (2022.01); *B01F 25/44167* (2022.01); *B01F 23/237611* (2022.01); *B01F 25/44161* (2022.01); *B01F 25/44163* (2022.01); *B01F 2101/17* (2022.01)

(58) Field of Classification Search

CPC .............. B01F 2101/17; B01F 23/2362; B01F 23/23611; B01F 25/43231; B01F 25/4323; B01F 25/44161; B01F 25/44162; B01F 25/44163; B01F 25/44164; B01F 25/44166; B01F 25/44167; B65D 1/023; B65D 23/04; B65D 25/48; B65D 39/14

USPC .................................. 99/277.1, 277.2, 323.1

See application file for complete search history.

(56) References Cited

U.S. PATENT DOCUMENTS

| | | | |
|---|---|---|---|
| 4,361,407 | A | 11/1982 | Pellegrini |
| 5,104,010 | A | 4/1992 | Codomiz |
| D633,745 | S | 3/2011 | Ross |
| D635,823 | S | 4/2011 | Mauffette |
| 8,727,324 | B2 | 5/2014 | Borden et al. |
| 8,783,665 | B2 | 7/2014 | Kuru et al. |
| 8,807,358 | B2 | 8/2014 | Devoy et al. |
| D712,199 | S | 9/2014 | Borden et al. |
| D741,645 | S | 10/2015 | Lau |
| 9,283,526 | B2 | 3/2016 | Smith |
| 9,399,197 | B2 | 7/2016 | Graham |

(Continued)

OTHER PUBLICATIONS

International Search Report for Application No. PCT/US20/65549 dated Mar. 10, 2021.

*Primary Examiner* — Reginald Alexander

(57) ABSTRACT

An aerator and an associated method and system are provided. The aerator includes an elongate body having a central bore that extends between proximal and distal ends of the body, and a plurality of channels formed in an outer surface of the body, the plurality of channels extending between the proximal and distal ends, and including at least two bends along their lengths. The bends in the channels help to provide a smoother flow of liquids passing through the aerator.

20 Claims, 7 Drawing Sheets

(56) References Cited

U.S. PATENT DOCUMENTS

| | | | |
|---|---|---|---|
| 9,463,423 | B2 | 10/2016 | Borden |
| D772,004 | S | 11/2016 | Khan |
| 9,486,754 | B2 | 11/2016 | Foldesi et al. |
| 9,676,508 | B2 | 6/2017 | Devoy |
| D799,894 | S | 10/2017 | Gaeta et al. |
| D840,189 | S | 2/2019 | Gaeta et al. |
| 10,258,938 | B2 | 4/2019 | Gaeta et al. |
| 10,258,939 | B2 | 4/2019 | Gupta et al. |
| D858,184 | S | 9/2019 | Gaeta et al. |
| 11,319,117 | B2 | 5/2022 | Spyropoulos |
| 2006/0020441 | A1 | 9/2006 | Toyoda et al. |
| 2010/0091605 | A1 | 4/2010 | Rasmussen et al. |
| 2010/0124594 | A1 | 5/2010 | Burroughs et al. |
| 2012/0074092 | A1 | 3/2012 | Devoy et al. |
| 2012/0156345 | A1 | 6/2012 | Agarwal et al. |
| 2012/0193318 | A1 | 8/2012 | Meager |
| 2013/0319253 | A1 | 12/2013 | Smith |
| 2015/0190770 | A1 | 7/2015 | Greter |
| 2016/0175782 | A1 | 6/2016 | Lau |
| 2018/0339813 | A1 | 11/2018 | Spyropoulos et al. |
| 2019/0184350 | A1 | 6/2019 | Terasaka |
| 2019/0209978 | A1 | 7/2019 | Gaeta et al. |

AERATOR

CROSS-REFERENCE TO RELATED APPLICATION

The present application is a Continuation of U.S. application Ser. No. 17/033,784, filed Sep. 26, 2020, which claims priority of U.S. Provisional Application No. 62/906,371, filed on Sep. 26, 2019, the contents of which are hereby incorporated by reference.

FIELD

The presently-disclosed invention relates generally to the aeration of a fluid, and in particular, to an aerator for the aeration of wine.

BACKGROUND

Some beverages, such as wine, benefit from aeration prior to drinking. Aeration refers to the process of exposing the wine to air or giving it a chance to "breathe" before drinking it. The reaction between gases in the air and wine changes the flavor of the wine. Exposing wine to air results in two important processes within the wine: evaporation and esterification. Allowing these processes to occur can improve the quality of the wine by changing its chemistry.

Many wines contain volatile compounds that readily evaporate in air. One such compound is ethanol. The presence of ethanol may result in the wine having an undesirable medicinal smell that overpowers other desirable aromas of the wine. Aerating the wine can help disperse some of the initial odor, making the wine smell better. Letting a bit of the alcohol evaporate allows the wine to become more expressive so that one smells the wine, and not just the alcohol.

In addition, many wines include sulfites that may be present naturally or added to help preserve the wine. In general, sulfites may have an undesirable odor, and aerating the wine may help disperse the sulfites.

Oxidation is the chemical reaction between certain molecules in wine and oxygen from the air. Compounds in wine which are susceptible to oxidation include catechins, anthocyanins, epicatechins, and other phenolic compounds. Some wines benefit from the changes in flavor and aroma from oxidation, as it can contribute to fruity and nutty aspects of the wine. Yet, too much oxidation may ruin the taste of the wine.

Several methods exist for aerating wine. The simplest method is simply pouring the wine into a glass or decanter and allowing the wine to breathe. However, this method can be inconsistent and time-consuming. Others have developed aerators that attach to the wine bottle. The aerators aerate the wine as it is poured from the bottle to the glass. One such aerator is described in U.S. Pat. No. 10,258,939. The aerator in that document has a cylindrical shape and includes a central axial bore that creates turbulence within the wine as it is poured into a glass. The outer surface of the aerator includes grooves that are intended to allow air to enter into the bottle as the wine is poured. However, these grooves quickly fill with wine which results in an uneven and "sloppy" pour from the bottle. This is undesirable.

Accordingly, there still exists a need for an improved aerator.

SUMMARY

One or more embodiments of the invention may address one or more of the aforementioned problems.

In one embodiment, embodiments of the invention provide an aerator comprising an elongate body having a central bore that extends between proximal and distal ends of the body, and a plurality of channels formed in an outer surface of the body, the plurality of channels extending between the proximal and distal ends, and including at least two bends along their lengths. As discussed below, the at least two bends helps to provide an aerator providing both improved flow of a liquid through the aerator, and improved aeration in comparison to prior art aerators.

In one embodiment, the aerator includes at least two bends that collectively comprise an angle formed in the channel. In some embodiments, the at least one of the at least two bends comprises a curve. In certain embodiments, the at least two bends comprises a repeating pattern of alternating convex and concave bends. In some embodiments, the at least one of the plurality of channels includes two 180° bends.

The bends or at least two bends may define an angle in a channel that is from about 20° to 180°. In some embodiments, the angle may be measured relative to a central axis of the aerator that extends longitudinally between the proximal and distal ends of the body of the aerator. In certain embodiments, the at least two bends comprises four successive angles that are each about 45°.

The number of channels on the outer surface of the aerator's body may be from 2 to 12, and in particular from 2 to 8. In certain embodiments, a length of the plurality of channels is from about 50 to 250 mm, such as from about 60 to 200 mm, and in particular from about 70 to 130 mm, or from about 100 to 120 mm.

In certain embodiments, a radius of the outer channels may be from about 0.020 to 0.080 mm, such as from about 0.03 to about 0.060. In one embodiment, a radius of the plurality of channels is about 0.050 mm.

In certain embodiments, the plurality of channels have a semi-spherical shape.

In certain embodiments, the plurality of channels may have a collective volume of the plurality of channels is less than 0.60 $mm^3$, such as from about 0.20 to 0.55 $mm^3$, from about 0.30 to 0.50 $mm^3$, from about 0.40 to 0.48 $mm^3$, or from about 0.42 to 0.45 $mm^3$.

In some embodiments, a ratio of channel length to the radius of the outer channel is greater than 1,200, such as from about 1,500 to 5,500, from about 2,000 to 2,750, or from 1,200 to 2,500. In one embodiment, a ratio of channel length to outer channel radius is from about 1,750 to 2,750, such as from about 2,000 to 2,500.

Embodiments of the invention are also directed to a system comprising a container including a neck; and an aerator disposed entirely within the container and at least partially within the neck, the aerator including a body having a length extending from a first end to a second end, the body defining a bore extending through the entirety of the body, and a plurality of channels formed in an outer surface of the body, the plurality of channels extending between the proximal and distal ends, and including at least two bends along their lengths.

In certain embodiments, the container is a wine bottle.

BRIEF DESCRIPTION OF THE DRAWINGS

Figure 1:
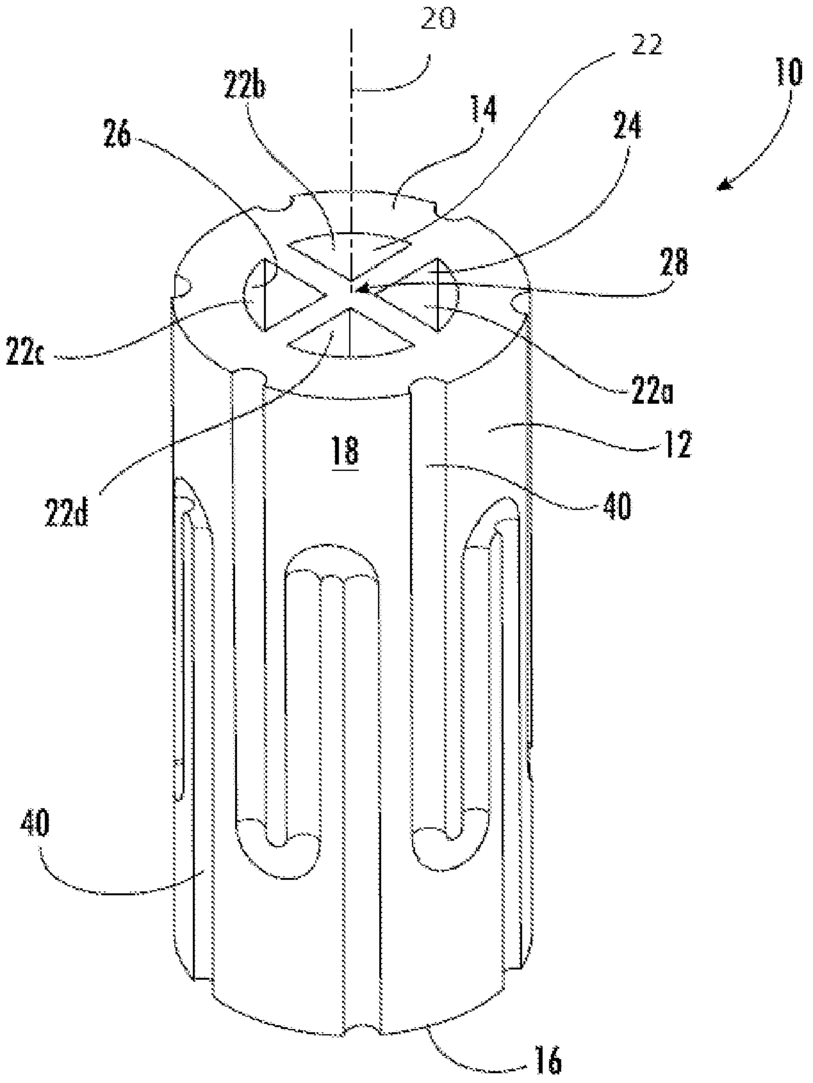

Having thus described the invention in general terms, reference will now be made to the accompanying drawings, which are not necessarily drawn to scale, and wherein:

FIG. 1 illustrates an example of an aerator in accordance with at least one embodiment of the present invention.

Figure 2A:
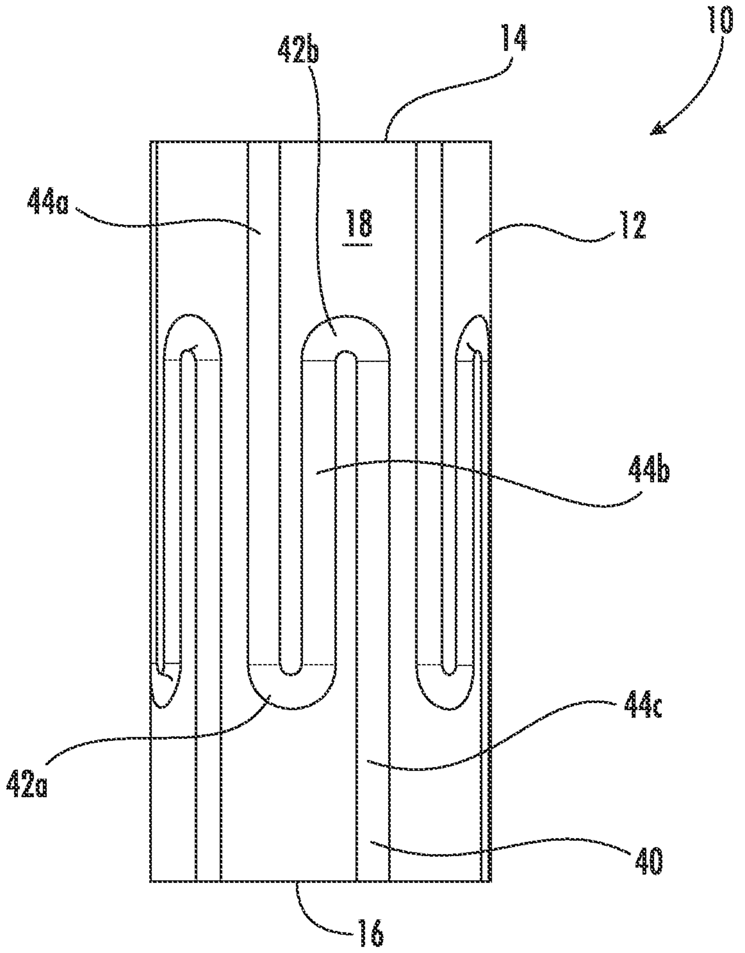
Figure 2B:
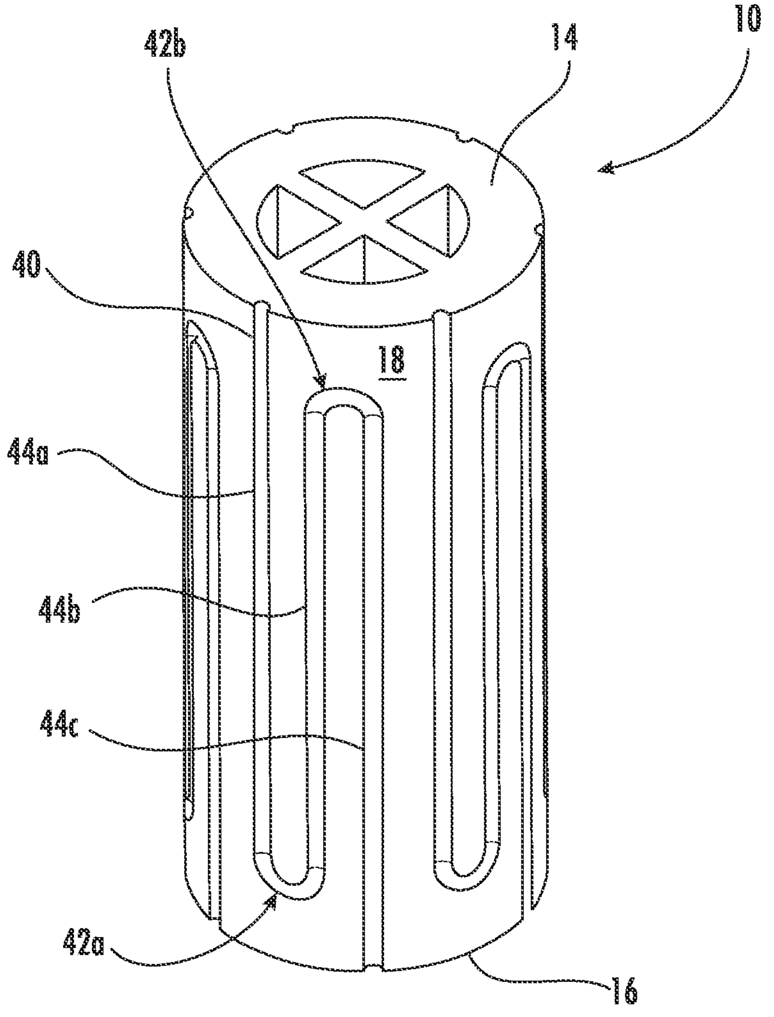
Figure 2C:
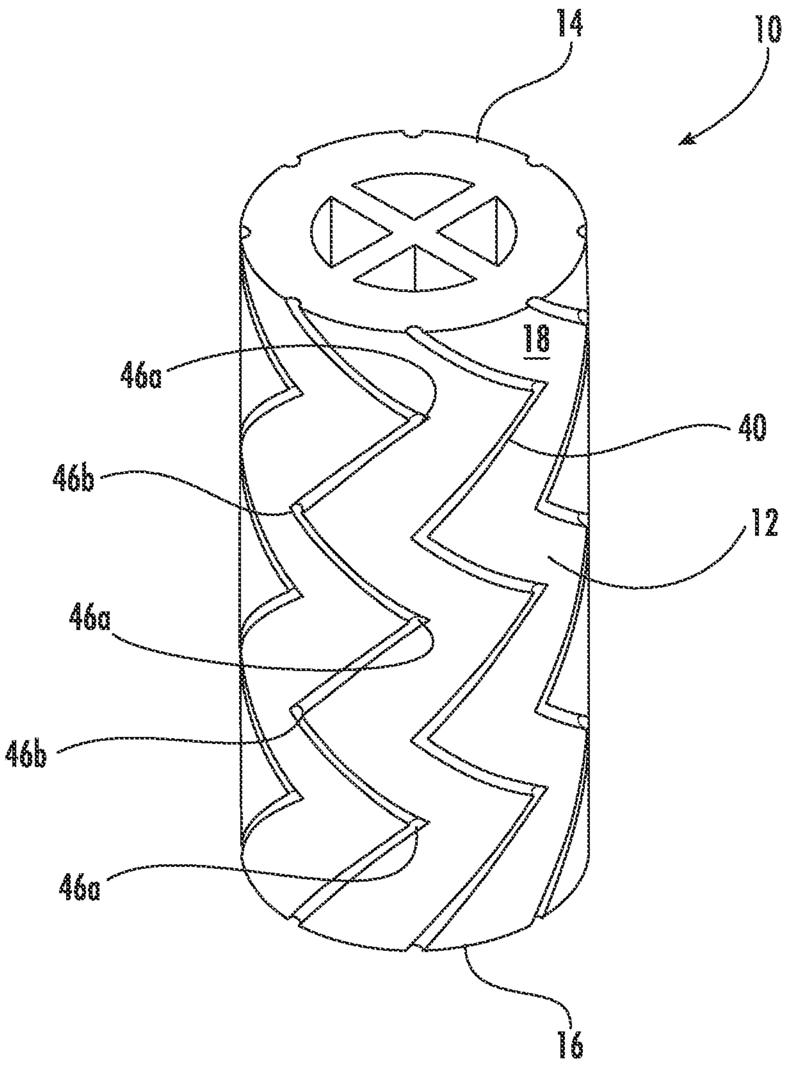
Figure 2D:
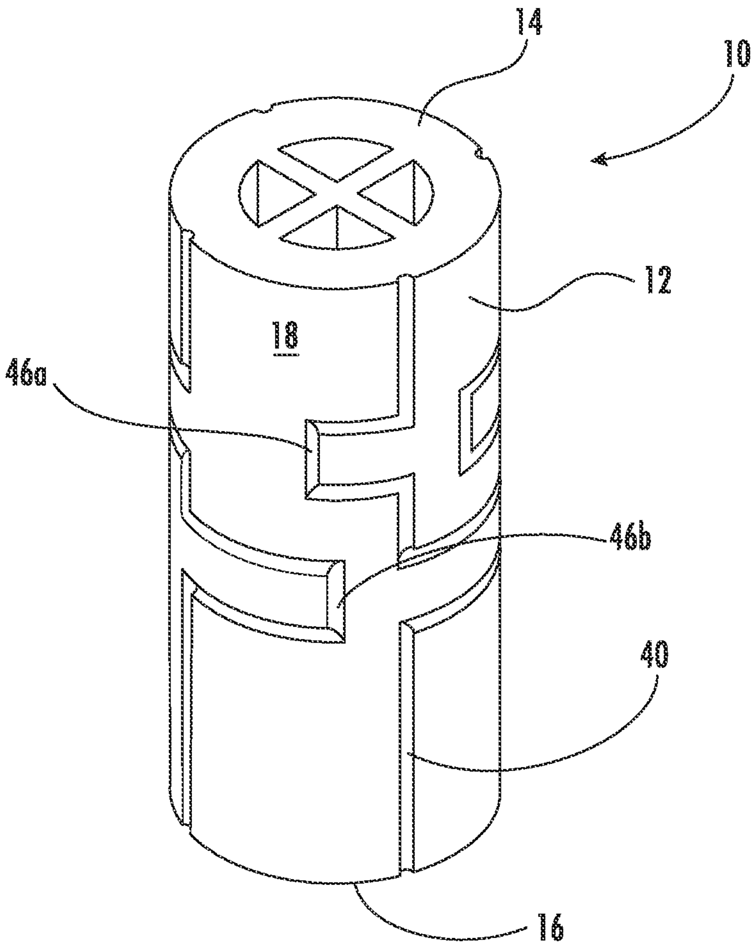
Figure 2E:
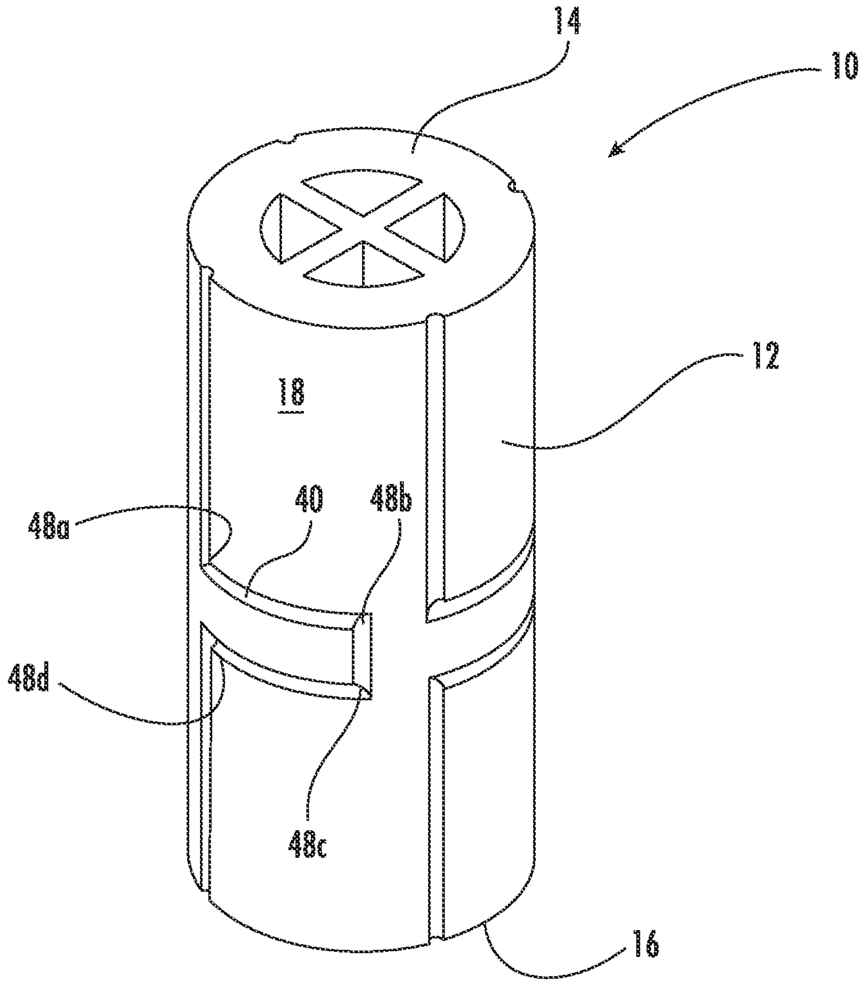
Figure 3:
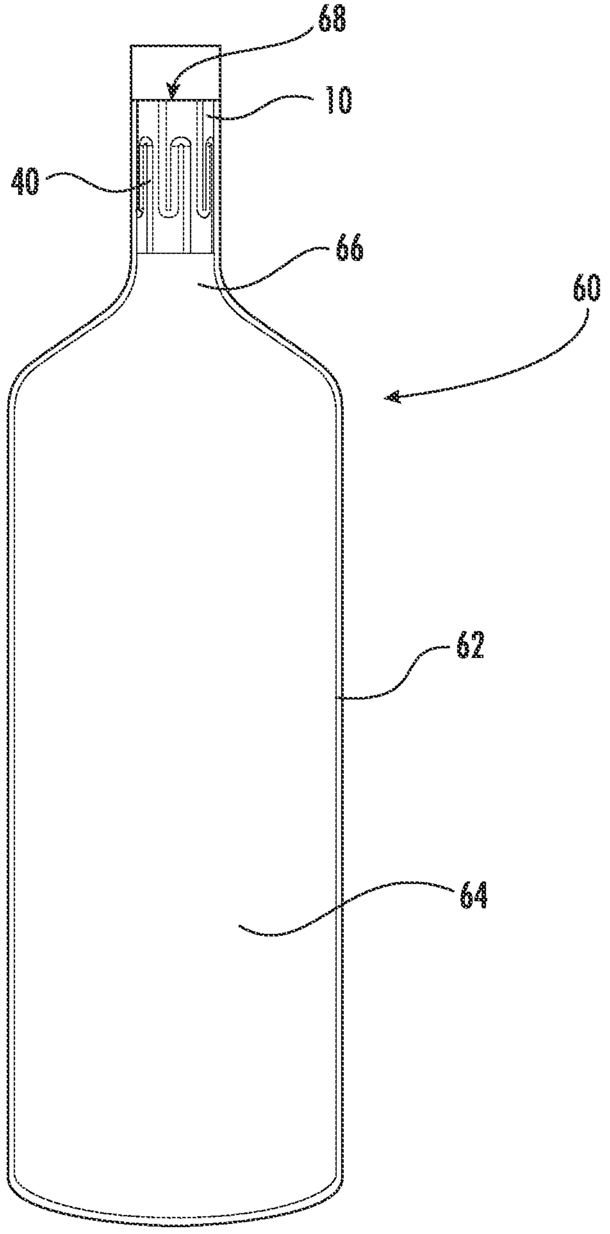

FIGS. 2A-2E illustrate examples of alternative embodiments of the aerator that are in accordance with the present invention; and FIG. 3 illustrates a system including a bottle and an aerator in accordance with an embodiment of the invention.

DETAILED DESCRIPTION

The invention now will be described more fully hereinafter with reference to the accompanying drawings, in which some, but not all embodiments of the inventions are shown. Indeed, the inventions may be embodied in many different forms and should not be construed as limited to the embodiments set forth herein; rather, these embodiments are provided so that this disclosure will satisfy applicable legal requirements. Like numbers refer to like elements throughout. As used in the specification, and in the appended claims, the singular forms “a”, “an”, “the”, include plural referents unless the context clearly dictates otherwise.

Definitions

For the purposes of the present application, the following terms shall have the following meanings:

As used herein, the term “bend” refers to a curved or angled section of a whole that includes a change in direction relative to a central axis.

As used herein, the term “container” means any object having an interior space for storing a liquid, and that includes a narrow neck having an opening through which the liquid may be poured out of the container. Examples of suitable containers includes bottles, receptacles, vessels, flasks, or the like that are suitable for containing a liquid. In a preferred embodiment, the container comprises a wine bottle. In some embodiments, the container may have an opening that is between 20 and 40 mm.

As used herein, the term “length” refers to the extent of a body from end to end along the greater of two or the greatest of three dimensions of a body.

As used herein, the term “longitudinally” refers to a direction that is lengthwise relative to an object.

As used herein, the term “laterally” refers to a direction that is perpendicular or substantially perpendicular to the length direction of an object.

As used herein, the term “polymer” generally includes, but is not limited to, homopolymers, copolymers, such as, for example, block, graft, random and alternating copolymers, terpolymers, etc. and blends and modifications thereof. Furthermore, unless otherwise specifically limited, the term “polymer” shall include all possible geometrical configurations of the material, including isotactic, syndiotactic and random symmetries.

As used herein, the term “pour” refers to the act of causing a liquid to flow from a container in a steady stream by holding the container at an angle.

Unless otherwise apparent from the context, the terms “about” and “substantially” encompasses values within a stated value or variations±0.5%, 1%, 5%, or 10% from a specified value.

In addition, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As discussed in greater detail below, embodiments of the invention are directed to aerator that is configured to be insertable into an opening of a container.

FIG. 1 shows a perspective view of an aerator in accordance with at least one embodiment of the invention, which designated by reference character 10. FIG. 2A shows a side plane view of the aerator of FIG. 1. The aerator 10 includes a generally elongate body 12. The body 12 includes a proximal end 14, an opposite distal end 16, and an outer surface 18. The body generally has a cylindrical shape and includes a central axis 20 that extends longitudinally between the proximal and distal ends of the body. In some embodiments, the body may have a tapered shape in which the diameter of the body gradually increases from the distal end towards the proximal end. In other words, the diameter of the body near the proximal end may be greater than the diameter of the body near the distal end. In other embodiments, the diameter of the body may be constant, or approximately constant, along the length of the body.

A central axial bore 22 extends through the body 12 from the proximal end 14 to the distal end 16. The bore 22 includes a plurality of vanes 24 that extend laterally across the radius of the bore from an inner surface 26 of the bore towards the central axis of the body. The plurality of vanes define a plurality of sub-bores (e.g., *22a*, *22b*, *22c*, and *22d*) that extend from the proximal end 14 to the distal end 16 of the body. Typically, the vanes 24 meet each other at a central region 28 near or adjacent to the central axis of the body and are interconnected to each other at this point.

The aerator 10 may include any number of vanes provided that a desired level of aeration occurs during pouring of the fluid while desirably maintaining a relatively smooth pour of the fluid through the aerator. For example, the aerator may include from 2 to 12 vanes, and in particular, 3 to 8, and more particularly, 4 to 6 vanes. In a preferred embodiment, the aerator includes 4 vanes. The vanes are not limited to any particular shape or configuration. In some embodiments, the surfaces of the vanes may be relatively flat or straight. In other embodiments, the vanes may have a curved shaped.

The outer surface 18 of the aerator includes a plurality of channels or grooves 40 that extend along the length of the body 12 between the proximal and distal ends 14, 16. The channels 40 provide a fluid pathway by which air may be introduced into the container during pouring. Preferably, the channels are non-linear; that is, they do not follow a relatively linear or continuously curved path between the distal or proximal ends of the body. Rather, the channels 40 include two or more bends that result in a change of direction of the channel relative to the previous direction of the channel. Generally, the bend may define an angle in the channel that is from about 20° to 180°.

It has been discovered that by including channels having at least two bends, flow of a fluid being poured from the container can be improved, and that better aeration may be achieved. In particular, the bends in the channels help to restrict the flow of a liquid flowing through the channels during a pour. That is, the bend retards or delays the flow of a liquid flowing through the channels. As a result, the residence time necessary for a liquid to flow from the distal end of a channel prior to exiting out of the proximal end of the channel during a pour is increased. Advantageously, this helps improve the smoothness of the flow of a liquid flowing through the aerator as the liquid flows from the container into a glass or other receptacle. In contrast, aerators that do not include at least two bends in the outer channels will typically have multiple streams of liquid flowing from both the central bore as well as channels on the outer surface of the aerator. Such multiple streams result in a sloppy pour and is therefore undesirable. In addition, liquid flowing through the outer channels prevents air from passing through the channels, which prevents the channels from performing their intended function.

FIGS. 2A-2E, show embodiments of the aerator 10 in which the channels include two or more bends. The aerators in FIG. 2A-2B include two bends 42*a* and 42*b* that are each about 180". Each of these bends results a reversal in direction of the channel pathway relative to the channel's previous pathway. Although the bends in FIG. 2A are depicted as curves, the bend could be completed by two or more successive angles, such as two successive 90° angles, three successive 60° angles, or four successive 45° angles, etc.

It is also noted that the channel in FIGS. 2A and 2B may also include discrete sections: a first section 44*a*, middle section 44*b*, and third section 44*c*, In the illustrated embodiments, the first section 44*a* extends from the proximal end 14 of the body towards a first bend 42*a*; the middle section 44*b* extends from the first bend 42*a* towards the second bend 42*b*; and the third section 44*c* extends from the second bend 42*b* towards the distal end 16 of the body. As shown in FIGS. 2A and 2B, the middle section has a reversed fluid pathway relative to the pathway of the first and third sections. The length of each section can be selected to increase or decrease the residence time of a liquid flowing through the channels. In this regard, it is noted that FIG. 2A depicts a channel 40 having a middle section 44*b* with a length that is less than the middle section 40*b* of the channel 40 depicted in FIG. 2B.

In some embodiments, the channels 40 may include a plurality of alternating convex and concave curves that extend longitudinally across the surface of the body 12. In this regard, FIGS. 2C and 2D illustrate embodiments of the aerator in which the channels include alternating convex 46*a* and concave 46*b* bends. In the embodiment illustrated in FIG. 2C, the channels include a repeating pattern of convex and concave bends that extend longitudinally between the proximal and distal ends of the channel. In addition, bends shown in in FIG. 2C defines an angle that is between about 80 to 90° when measured near the apex of the bend.

In the embodiment in FIG. 2E, the channels include a plurality of bends 48*a*, 48*b*, 48*c*, and 48*d* in which each angle is about 45°. The embodiment of the aerator shown in FIG. 2E is similar to that of the aerator of FIG. 2D with the exception that it does not include both a concave and convex bend.

The number of bends per channel is not limited to any particular number, although it has been found that embodiments having from 2 to 20 channels perform particularly well. In one embodiment, each channel may have from about 2 to 10 bends, and in particular, from about 2 to 4 bends.

Although each channel in the illustrated embodiments includes at least two bends, it should be recognized that in some embodiments, the aerator may include one or more channels that do not include a bend, or include a single bend, such as a continuous curve.

Generally, it has been found that the volume and length of the channels influences the residence of time of wine entering the channels during a pour. In particular, by balancing the volume and lengths of the channel, aerators having improved liquid flow may be provided.

In one embodiment, the length of the channels may range from about 50 to 250 mm, and in particular, from about 60 to 200 mm, and more particularly, from about 70 to 130 mm. In a preferred embodiment, the channels may have a length that is from about 100 to 120 mm, and more preferably, from about 105 to 115 mm.

In one embodiment, the channels have a radius that is from about 0.020 to 0.080 mm, and in particular, from about 0.030 to about 0.060. In some embodiments, the channels have a radius that is about 0.050 mm. With respect to the radius of the channels, it is noted that in the illustrated embodiments, the channels have a semi-spherical shape, and therefore have a measurable radius; however, it should be recognized that the channels may have different shapes, such a square, rectangular, or the like. Accordingly, there may be embodiments of the aerator that do not include a radius.

The collective volume of the channels is typically less than 0.60 $mm^3$, and more typically less than 0.50 $mm^3$. In particular, the collective volume of the channels may range from about 0.20 to 0.55 $mm^3$, 0.30 to 0.50 $mm^3$, and in particular, 0.040 to 0.048 $mm^3$. In a preferred embodiment, the collective volume of the channels is from about 0.042 to 0.045 $mm^3$.

As discussed previously, the restricting the volume of liquid that may enter the channels helps to provide an aerator having improved flow during a pour. Restriction of the volume can be controlled based on the selection of length and radius of the channels. It has been discovered that aerators having a ratio of channel length to radius that is greater than 1,000 helps to improve flow during a pour. In certain embodiments, the ratio of channel length to channel radius is greater than 1,200, such as greater than 1,500. In some embodiments, the ratio of channel length to radius is from about 1,000 to 3,000, such as from 1,000 to 2,750. In some embodiments, the ratio is from about 1,200 to 3,000, such as from 1,200 to 2,500 or about 1,500 to 3,000. In some embodiments, the ratio is from about 1,500 to 5,500, and in particular, from about 1,750 to 2,750, and more particularly, from about 2,000 to 2,500. In a preferred embodiment, the aerator has a ratio of channel length to radius that is from about 1,750 to 2,500, and in particular, from about 1,800 to 2,500.

In the embodiments described above, the aerator includes a central bore having a plurality of vanes. However, it should be recognized that other configurations are within the scope of the invention. For example, in some embodiments, the central bore may be non-linear, such as having a helically shaped bore that extends longitudinally between the proximal and distal ends of the aerator. Such a configuration is described in U.S. Pat. No. 10,258,939, the contents of which are hereby incorporated by reference. In some embodiments, the central bore may include one or more interruptions that are disposed along the length of the bore. In some embodiments, the bore has a varying diameter along its length, for example, the bore may include one or more regions where the diameter is smaller than adjacent regions, or may include a taper.

The aerator can be formed from a variety of polymers and inert materials, including materials commonly used for corks. Examples of such materials include, but are not limited to, Affinity™ polyolefin plastomer available from The Dow Chemical Company of Midland, Mich., thermoplastic elastomer (TPE) containing styrene ethylene butadiene styrene (SEBS) block copolymer, thermoplastic vulcanizate (TPV), thermoplastic polyurethane (TPU), and polysiloxanes to list a few possibilities. Other materials include biodegradeable or compostable materials, such as PLA or other sustainable polymers. One such polymer is produced from the polymerization of comonomers 3-hydroxybutyrate and 3-hydroxyhexanoate, which is available from KANEKA under the tradename PHBH™. The disclosed aerators also can be formed from recyclable materials allowing it to be disposed of/recycled with the bottle without requiring consumer interaction. Yet another material of choice is an aerator made with natural cellulosic materials (e.g., oak bark micro agglomerates extruded or injection molded into the aerator. The aerators also can be formed by stamping out oak or acacia wood.

Aerators in accordance with embodiments of the present invention may be formed from a variety of manufacturing processes including, for example, extrusion, injection molding, and machining. In pre-market implementations, the aerators can be incorporated into containers using standard bottling equipment with minimal or no modifications to the machinery.

Aerators in accordance with the invention may be used in variety of ways. In some embodiments, the aerator may be inserted into the neck of a bottle just prior to use. For example, a user may open a bottle containing a liquid, and then insert the aerator into the bottle prior to pouring the liquid.

In other embodiments, the aerator may be inserted into the container during the manufacturing process. For example, prior to filling the container, or after the container has been filled with a liquid, the aerator may be inserted into the neck of the container. Thereafter, the container can be sealable closed with a suitable closure device, such as a screw cap. This method is particularly advantageous for circumstances in which it is desirable to bottle and ship the liquid with the aerator preinstalled in the container.

With reference to FIG. 3, a system incorporating the aerator 10. The system 60, includes a container 62 having an interior space 64 for containing a liquid. An upper portion of the container includes a neck 66 and an opening 68 from which a liquid may be dispensed from the interior space of the container. An aerator 10 in disposed within the neck of the container. As described previously, the aerator includes a central bore (not shown) and a plurality of channels 40 formed on the outer surface of the aerator. During a pour of the liquid from the container, the liquid flows through the central bore of the aerator and out of the opening of the container. The plurality of channels 40, permit air to be introduced into the container during the pour. The channels help to improve aeration of the liquid and provide a smoother pour of the liquid. Although not illustrated, the opening of container can be closed with a screw cap or other conventional means for closing a container.

In one embodiment, the invention provides methods of aerating a liquid. For instance, the aerating methods include inserting an aerator into a neck or throat of a container, and pouring a liquid from the container through the throat of the container that includes the aerator disposed therein. The presence of the aerator in the throat of the container causes turbulence within the bottle thereby mixing air with the liquid. As the liquid pours through the lower portion of the aerator, the external air passes through the channels located on the outer surface of the aerator to fill the gas space in the container.

The liquid can be any liquid, including wine, whiskey, and/or a liquid having tannins and polyphenols. In a preferred embodiment, the liquid is wine.

In one embodiment, the container is a wine bottle. In some embodiments, the length of the aerator is dimensioned to be received entirely within a neck of a container.

EXAMPLES

The following examples are provided for illustrating one or more embodiments of the present invention and should not be construed as limiting the invention.

In the following example, an aerator in accordance with the claimed invention was compared to an aerator available from Jetstream Wine Technologies. The Jetstream aerator was similar to the aerator depicted in FIG. 3 of U.S. Pat. No. 10,258,929, and included grooves on the outer surface. The grooves on the Jetstream aerator extended linearly between the top and bottom ends of the aerator. The inventive aerators included outer channels that included at least two bends and were similar in design to the aerator shown in FIG. 1.

In the example, each aerator was inserted into a non-poured bottle of wine. The bottle was then held at an angle of about 30° relative to a glass. Wine was then poured from the bottle into the glass for one minute. During the pour, the Jetstream aerator exhibited an uneven pour with multiple streams of wine pouring through the bore of the aerator as well as the grooves on the exterior surface of the aerator. In contrast, the inventive aerators provided a smooth pour in which wine did not flow out of the outer channels during the pour.

In addition, the wine poured out rapidly through the Jetstream aerator in comparison to the inventive aerator. As shown in Table 1, nearly the entire 750 mL bottle of wine was poured during the 1-minute test period. Such a rapid flow of wine is undesirable and results in poor aeration during the pour.

The properties of the aerators are provided in Table 1 below.

TABLE 1

Comparison of Inventive and Jetstream Aerators

| | Length (mm) | Outer Diameter (mm) | Radius of Outer Channels (mm) | Length of Outer Surface Channels (mm) | Ratio of Outer Channel Length to Radius | Volume of Outer Surface Channels ($mm^3$) | Volume of Wine poured (mL) |
|---|---|---|---|---|---|---|---|
| Inventive Aerator No. 1 | 43 | 20.2 | 0.050 | 113 | 2260 | 0.44 | 135 |
| Inventive Aerator No. 2 | 43 | 20.2 | 0.1 | 113 | 1130 | 0.64 | 400 |
| Jetstream aerator | 43 | 20.2 | 0.1 | 43 | 430 | 1 | 700 |

Interestingly, the outer channels of Inventive Aerator 2 had about the same radius as the outer grooves on the Jetstream aerator, but exhibited an even and smooth pour. In addition, Inventive Aerator 2 had a ratio of outer channel length to radius of 1,130. This is a percent difference of about 89% between the Jetstream aerator and Inventive Aerator 2. In addition, the percent increase in the ratio was about 163%. Increasing the ratio of the outer channel length to outer channel radius significantly improves the pour of the liquid through the aerator in comparison to prior art aerators.

That which is claimed:

1. An aerator comprising an elongate body having a central bore that extends between proximal and distal ends of the body, the central bore defining a fluid passageway extending entirely through the aerator, and a plurality of air channels formed in an outer surface of the body, the plurality of air channels extending between the proximal and distal ends, and wherein a ratio of channel length to channel radius is greater than 1,000.

2. The aerator of claim 1, wherein the ratio of air channel length to radius is from about 1,000 to 3,000.

3. The aerator of claim 1, wherein the ratio of air channel length to radius is from about 1,800 to 2,500.

4. The aerator of claim 1, wherein the aerator includes the following:

an air channel collective volume of less than 0.60 $mm^3$;

a ratio of air channel length to air channel radius from about 1,000 to 2,750; and an average air channel radius from about 0.020 to 0.080 mm.

5. The aerator of claim 1, wherein the aerator includes at least one bend defining an angle formed in the air channels.

6. The aerator of claim 1, wherein the air channels include at least two bends along their lengths.

7. The aerator of claim 6, wherein at least one of the at least two bends comprises an angle formed in the air channels.

8. The aerator of claim 6, wherein at least one of the at least two bends comprises a curve.

9. The aerator of claim 6, wherein at least two bends comprises a repeating pattern of alternating convex and concave bends.

10. The aerator of claim 6, wherein at least one of the plurality of channels includes two 180° bends.

11. The aerator of claim 6, wherein the at least two bends comprises four successive angles that are each about 45°.

12. The aerator of claim 1, wherein the number of air channels is from 2 to 8.

13. The aerator of claim 1, wherein a length of the plurality of air channels is from about 50 to 250 mm.

14. The aerator of claim 1, wherein a radius of the plurality of air channels is from about 0.020 to 0.080 mm.

15. A system, comprising: a container including a neck; and an aerator disposed entirely within the container and at least partially within the neck, the aerator including a body having a length extending from a first end to a second end, the body defining a bore extending through the entirety of the body, and a plurality of air channels formed in an outer surface of the body, the plurality of channels extending between the proximal and distal ends, and wherein a ratio of channel length to channel radius is greater than 1,000.

16. The system of claim 15, wherein the container is a wine bottle.

17. The system of claim 15, wherein a length of the plurality of channels is from about 50 to 250 mm, a radius of the plurality of channels is from about 0.20 to 0.80 mm, a collective volume of the plurality of channels is from about 0.20 to 0.55 $mm^3$, and a ratio of channel length to radius is from about 1,500 to 3,000.

18. The system of claim 15, wherein the plurality of channels have a semi-spherical shape.

19. The system of claim 15, wherein the aerator includes at least one bend defining an angle formed in the air channel.

20. The system of claim 15, wherein the air channels include at least two bends along their lengths.

* * * * *